US012617348B2

(12) United States Patent
Mukai et al.

(10) Patent No.: US 12,617,348 B2
(45) Date of Patent: May 5, 2026

(54) LUGGAGE SYSTEM AND VEHICLE INCLUDING SAME

(71) Applicant: TOYOTA BOSHOKU KABUSHIKI KAISHA, Aichi (JP)

(72) Inventors: Rina Mukai, Aichi (JP); Tokuyuki Nishikawa, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 43 days.

(21) Appl. No.: 18/679,892

(22) Filed: May 31, 2024

(65) Prior Publication Data

US 2024/0409033 A1 Dec. 12, 2024

(30) Foreign Application Priority Data

Jun. 6, 2023 (JP) ................................. 2023-093399

(51) Int. Cl.
B60R 7/02 (2006.01)
(52) U.S. Cl.
CPC ..................................... B60R 7/02 (2013.01)
(58) Field of Classification Search
CPC ... B60R 7/02; B60R 5/00; B60P 7/135; B60P 7/0892

USPC ........................................... 224/281; 410/121
See application file for complete search history.

(56) References Cited

U.S. PATENT DOCUMENTS

| | | | | |
|---|---|---|---|---|
| 8,858,137 | B2 * | 10/2014 | Aro ........................... | B60R 7/02 |
| | | | | 410/121 |
| 10,160,374 | B2 * | 12/2018 | Salazar Loera ....... | B60P 7/0892 |
| 12,485,963 | B1 * | 12/2025 | Niedert ................... | B60T 1/065 |
| 12,488,225 | B1 * | 12/2025 | Estrada ................. | G06N 3/0475 |
| 2018/0245365 | A1 * | 8/2018 | Wankewycz .............. | E04H 6/44 |

FOREIGN PATENT DOCUMENTS

JP 8-11622 1/1996

* cited by examiner

*Primary Examiner* — Peter N Helvey
(74) *Attorney, Agent, or Firm* — Greenblum & Bernstein, P.L.C.

(57) ABSTRACT

Adjusted is a stop position of a slide bar in accordance with luggage placed on a luggage space. In a case where a detection part configured to detect whether or not luggage exists has detected that the luggage exists, a controller of a luggage system controls a driving mechanism configured to drive a slide bar, to cause the slide bar to move in a first direction and adjusts a stop position of the slide bar in the first direction.

15 Claims, 9 Drawing Sheets

FRONT
UP
LEFT ← → RIGHT
DOWN
REAR

LUGGAGE SYSTEM AND VEHICLE INCLUDING SAME

This Nonprovisional application claims priority under 35 U.S.C. § 119 on Patent Application No. 2023-093399 filed in Japan on Jun. 6, 2023, the entire contents of which are hereby incorporated by reference.

TECHNICAL FIELD

The present disclosure relates to a luggage system and a vehicle including the same.

BACKGROUND ART

Patent Literature 1 discloses a device configured to fix luggage placed in a trunk of a vehicle. The trunk is provided with an air bag inside thereof. In a case where the luggage is fixed, air is injected into the air bag by driving an air pump. The air bag expands through the injection of air, and a bracing plate of the air bag moves in accordance with the expansion of the air bag. The luggage is held between the bracing plate of the air bag and a rear wall surface of the trunk so as to be fixed in the trunk.

CITATION LIST

Patent Literature

[Patent Literature 1]
Japanese Patent Application Publication Tokukaihei No. 8-11622

SUMMARY OF INVENTION

Technical Problem

Unfortunately, in the device disclosed in Patent Literature 1, the bracing plate is caused to move by the expansion of the air bag, and thus the air to be injected into the air bag cannot be smoothly adjusted. Further, a certain amount of air injected into the air bag does not always result in a constant degree of the expansion of the air bag. Therefore, even if the air to be injected into the air bag is adjusted, it is difficult to adjust a stop position of the bracing plate with respect to the luggage.

It is an object of an aspect of the present disclosure to adjust a stop position of a slide bar in accordance with luggage placed in a luggage space.

Solution to Problem

In order to solve the foregoing problem, a luggage system in accordance with an aspect of the present disclosure is a luggage system included in a vehicle, the luggage system including: a detection part configured to detect whether or not luggage placed on a placement surface of a luggage space exists; a slide bar configured to move in a first direction along the placement surface; a driving mechanism configured to drive the slide bar; and a controller, wherein in a case where the detection part has detected that the luggage exists, the controller controls the driving mechanism to cause the slide bar to move in the first direction and adjusts a stop position of the slide bar in the first direction.

Advantageous Effects of Invention

According to an aspect of the present disclosure, it is possible to adjust a stop position of a slide bar in accordance with luggage placed in a luggage space.

DESCRIPTION OF EMBODIMENTS

Embodiment 1

The following describes an embodiment of the present disclosure in detail with reference to FIGS. 1 to 8.
(Outline of Vehicle)

Figure 1:
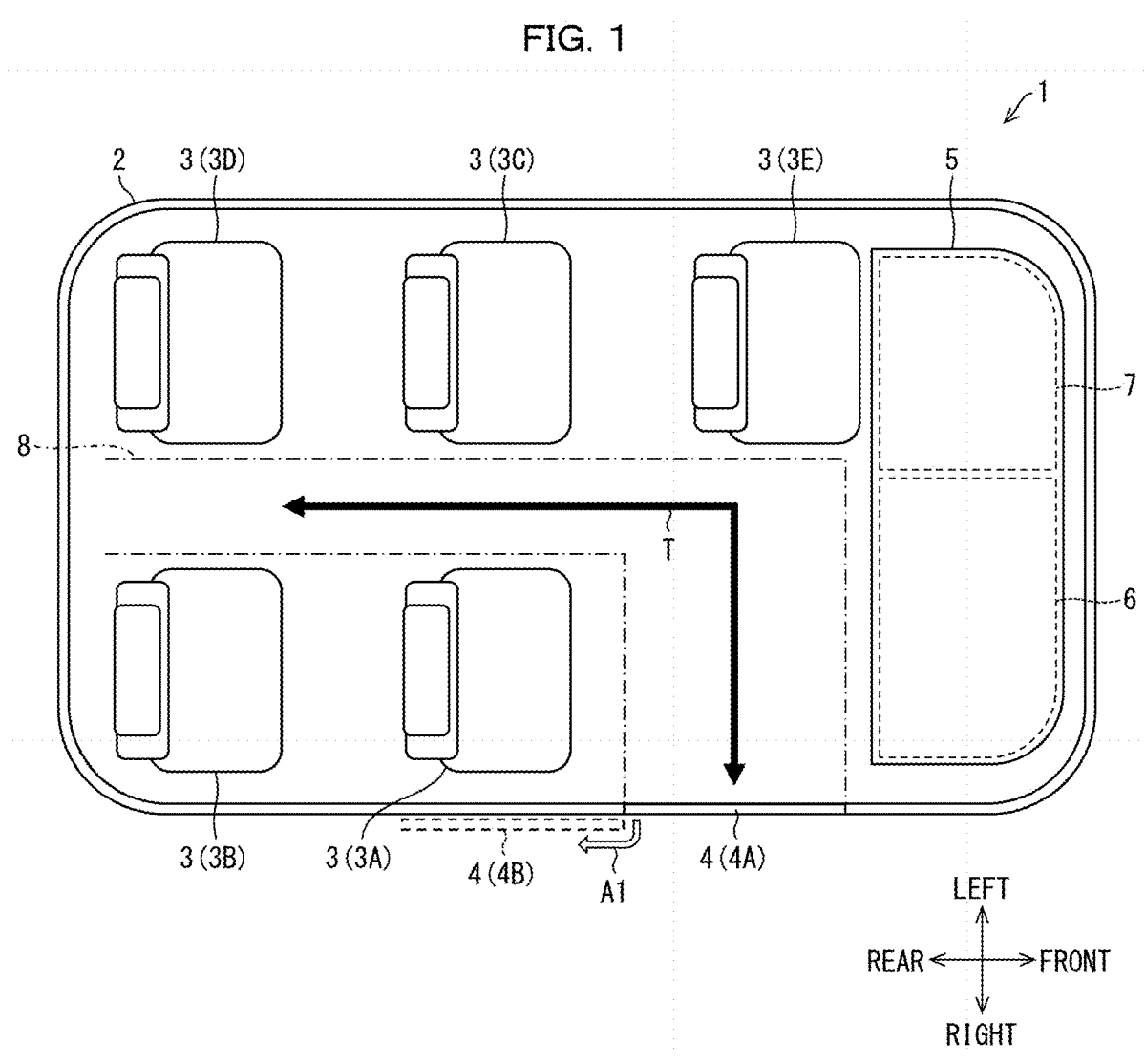
FIG. 1 is a view schematically illustrating an internal configuration of a vehicle in accordance with Embodiment 1 of the present disclosure.

With reference to FIG. 1, the following description will discuss an outline of a vehicle 1 provided with a luggage system 10 (see FIG. 2) of the present disclosure. FIG. 1 is a view schematically illustrating an internal configuration of the vehicle 1 in accordance with Embodiment 1. For simplification of descriptions, an up-and-down direction, a front-and-rear direction, and a left-and-right direction are defined as indicated by arrows in FIG. 1 and the like. The front-and-rear direction corresponds to a travelling direction of the vehicle 1, and a front side corresponds to the travelling direction of the vehicle 1 that is advancing. The left-and-right direction is a direction orthogonal to the front-and-rear direction and corresponds to a left-and-right direction seen from a user facing forward. The left-and-right direction is also a width direction of the vehicle 1. The up-and-down direction is a direction orthogonal to the front-and-rear direction and the left-and-right direction and is a height direction of the vehicle 1. A down side corresponds to a floor side of the vehicle 1 with respect to the user on the vehicle 1.

The vehicle 1 is a vehicle which the user is to board and which travels through automated driving. The automated driving of the vehicle 1 is performed by executing an automated driving system. For example, the vehicle 1 is remotely operated by an operator and travels along a specific travelling route.

The vehicle 1 includes a vehicle body 2 and seats 3. The vehicle body 2 creates an appearance of the vehicle 1 and forms, inside the vehicle body 2, an interior space. In the interior space of the vehicle 1, the seats 3 on which respective users are to be seated are installed. The seats 3 include fixed seats 3A to 3D which are fixed to the floor of the vehicle 1 and a foldable seat 3E which can be folded. The fixed seats 3A to 3D are installed in two rows on a rear side of the vehicle 1. The foldable seat 3E is installed on a front side of the interior space of the vehicle 1.

On a right front side of the vehicle body 2, a platform door 4 that allows a user to board and exit the vehicle 1 is attached. The platform door 4 moves between a closed position 4A in which the entrance of the vehicle 1 which allows the user to board and exit the vehicle 1 is closed and an opened position 4B in which the entrance of the vehicle 1 which allows the user to board and exit the vehicle 1 is opened. Users who board or exit the vehicle 1 through the platform door 4 moves in the interior space of the vehicle 1 along a movement line T. The movement line T is defined by a pathway 8 which is formed inside the interior space of the vehicle 1 and along which the user is to pass.

On a front side in the interior space of the vehicle 1, a luggage space 5 on which luggage L of a user (see FIG. 2) is to be placed is formed. The luggage space 5 has a placement surface along a horizontal direction on which luggage is to be placed. The luggage space 5 is formed in a space identical to the interior space in which the user seated on each seat 3 exists, and is located ahead of the seats 3. The fact that the luggage space 5 is located on a front side in the interior space of the vehicle 1 causes the luggage L to be located in a position that the user can view. This can provide a sense of security to the user. The luggage space 5 is located alongside the movement line T. The fact that the luggage space 5 is located alongside the movement line T enables the user to smoothly load and unload the luggage L.

The luggage space 5 includes a first luggage space 6 and a second luggage space 7. The first luggage space 6 is located on a right side of the vehicle 1 in the left-and-right direction. That is, the first luggage space 6 is located on a platform door 4 side of the luggage space 5 in the left-and-right direction. The second luggage space 7 is located on a left side in the left-and-right direction. That is, on a seat 3E side of the luggage space 5 in the left-and-right direction, the second luggage space 7 is located. When the seat 3E is in a folded state, that is, is not in use, the second luggage space 7 is used as a space in which the luggage L is to be placed. When the seat 3E is in a state that allows the user to be seated thereon, that is, is in use, the second luggage space 7 is used as a space on which the feet of the user are to be put. (Luggage System)

Figure 2:
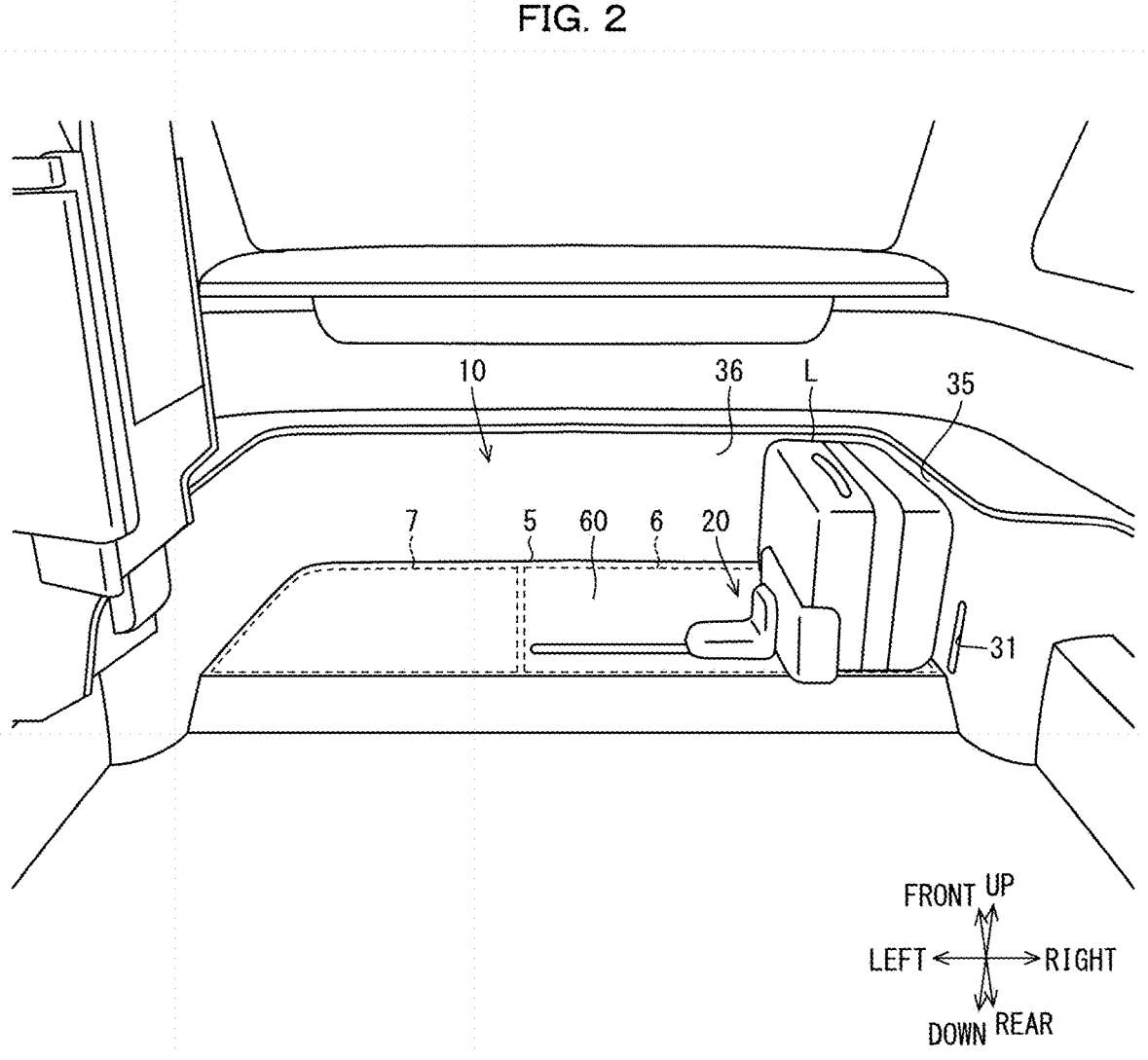
FIG. 2 is a view of a luggage space illustrated in FIG. 1 as viewed from behind.
Figure 3:
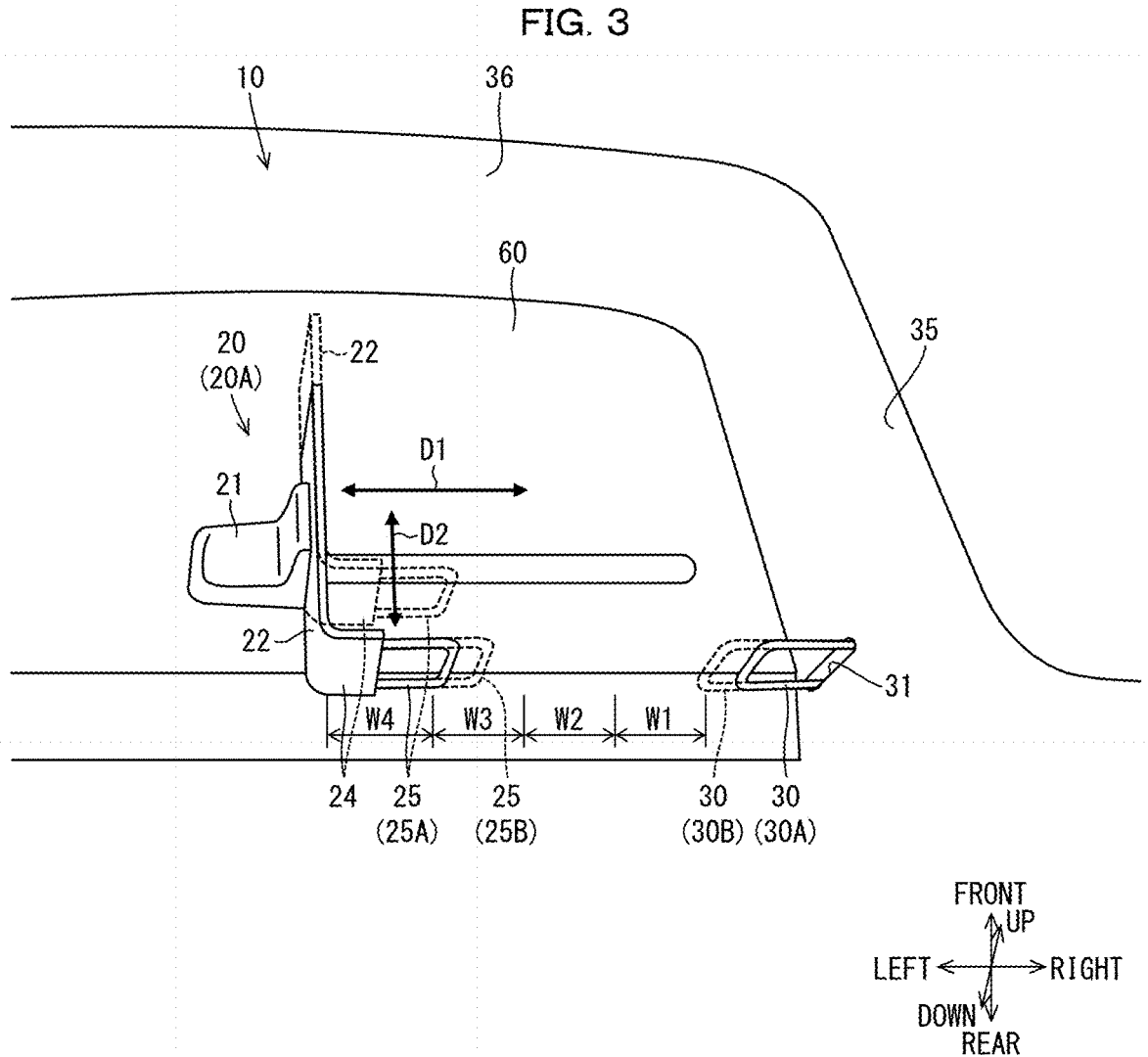
FIG. 3 is a perspective view of a luggage system illustrated in FIG. 2 as viewed from above.
Figure 4:
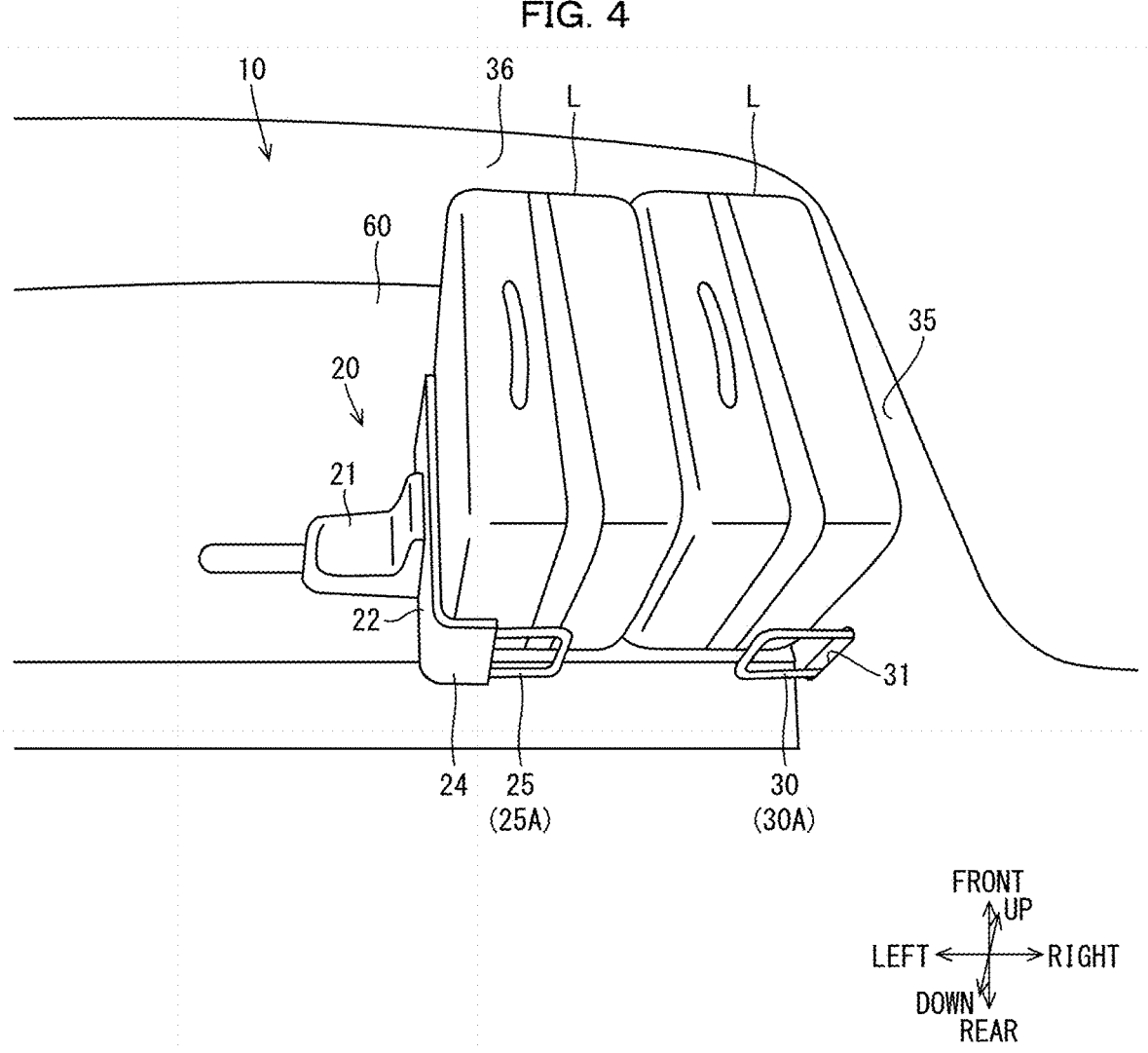
FIG. 4 is a perspective view illustrating a luggage system in which luggage is placed.

With reference to FIGS. 2 to 4, the following will describe the luggage system 10. FIG. 2 is a view illustrating the luggage space 5 in FIG. 1 as viewed from behind. FIG. 3 is a perspective view illustrating the luggage system 10 in FIG. 2 as viewed from above. FIG. 4 is a perspective view illustrating the luggage system 10 in which the luggage L is placed.

As illustrated in FIG. 2, the vehicle 1 includes the luggage system 10. The luggage system 10 is a system configured to restrict the luggage L placed in the luggage space 5 from moving to the outside of the luggage space 5. In the present embodiment, the luggage system 10 is applied as a system that restricts the luggage L placed in the first luggage space 6 from moving.

The luggage system 10 includes a slide bar 20 and a second small bar 30. As illustrated in FIG. 3, the slide bar 20 can abut on the luggage L placed on a placement surface 60 of the first luggage space 6, and the abutting on the luggage L causes the luggage L to be restricted from moving to the outside of the first luggage space 6. When viewed from above, the slide bar 20 is in a shape like the letter L.

As illustrated in FIG. 3, the slide bar 20 includes a support part 21, a first wall 22, and a second wall 24. The support part 21 supports the first wall 22 and the second wall 24. The support part 21 is connected with a driving mechanism 26 described later. The first wall 22 is a wall attached to the support part 21 and extending in the front-and-rear direction. The second wall 24 is a wall formed integrally with the first wall 22 and extending in the left-and-right direction with respect to the first wall 22. More specifically, the second wall 24 protrudes rightward from a rear end part of the first wall 22.

The second wall 24 includes a first small bar 25. In the present embodiment, when viewed from the front-and-rear direction, the first small bar 25 is in a shape like the letter U. The first small bar 25 is attached to the right end part of the second wall 24. The first small bar 25 can move between a normal position 25A and an extension position 25B in which the small bar 25 protrudes rightward beyond the normal position 25A. That is, the first small bar 25 is attached to the second wall 24 so as to be extendable rightward with respect to the second wall 24. The normal position 25A is a leftmost position within a range in which the first small bar 25 moves in the left-and-right direction. The extension position 25B is a rightmost position within a range in which the first small bar 25 moves in the left-and-right direction. The first small bar 25 moves to the normal position 25A or the extension position 25B on the basis of the stop position of the slide bar 20 in the left-and-right direction.

The slide bar 20 is a member movable along the placement surface 60 in the first luggage space 6. More specifically, the slide bar 20 is provided so as to be able to reciprocate in the left-and-right direction indicated by the arrow D1 and be able to reciprocate in the front-and-rear direction indicated by the arrow D2.

Specifically, the support part 21 moves in the left-and-right direction with use of the driving power from the driving mechanism 26. The first wall 22 and the second wall 24 also move in the left-and-right direction in accordance with the movement of the support part 21 in the left-and-right direction. The first wall 22 is attached so as to be movable in the front-and-rear direction with respect to the support part 21, as indicated by the dashed line in FIG. 3. When the first wall 22 moves in the front-and-rear direction with respect to the support part 21 through the driving power from the driving mechanism 26, the second wall 24 also moves in the front-and-rear direction.

When the first wall 22 has moved rightward in the left-and-right direction, the first wall 22 abuts on the luggage L, as illustrated in FIG. 4. The first wall 22 restricts the luggage L from moving leftward. When the second wall 24 has moved forward in the front-and-rear direction, the second wall 24 abuts on the luggage L. The second wall 24 and the first small bar 25 restrict the luggage L from moving rearward.

FIG. 3 illustrates the slide bar 20 located in a farthest position 20A by a solid line. The farthest position 20A is a position of the slide bar 20 in which the first luggage space 6 on which the luggage L is to be placed has the largest space. The slide bar 20 being located in the farthest position 20A makes it easier for the user aboard to place the luggage L on the first luggage space 6. In addition, the slide bar 20 being located in the farthest position 20A makes it easier for the user who is to exit to take the luggage L out of the first luggage space 6. In the present embodiment, the farthest position 20A is a leftmost position within the range in which the slide bar 20 is movable in the left-and-right direction. That is, the farthest position 20A is a position that causes an interval in a left-and-right direction between the first wall 22 of the slide bar 20 and a first standing wall 35 described later to be the largest. In addition, the farthest position 20A is a rearmost position within the range in which the slide bar 20 is movable in the front-and-rear direction. That is, the farthest position 20A is a position causes an interval in the front-and-rear direction between the second wall 24 of the slide bar 20 and a second standing wall 36 described later to be the largest. In a case where no luggage L is placed in the first luggage space 6, the slide bar 20 is located in the farthest position 20A.

In the present embodiment, a controller 50 described later determines in which of sections the slide bar 20 stops among four first to fourth sections W1 to W4 into which the range in which the slide bar 20 moves in the left-and-right direction is divided. Specifically, the slide bar 20 is determined as to in which of the first section W1 to the fourth section W4 the slide bar 20 stops, on the basis of the position in the left-and-right direction in which the first wall 22 is located when the slide bar 20 stops. More specifically, the stop position of the slide bar 20 in the left-and-right direction is determined depending on in which section the right-facing surface of the first wall 22, which is a surface that can abut on the luggage L is located.

As illustrated in FIG. 3, the sections thus divided are the first section W1, the second section W2, the third section W3, and the fourth section W4 in order from right. The first section W1 is a section in which the first wall 22 of the slide bar 20 stopping in a rightmost position within the range in which the slide bar 20 moves is located. The fourth section W4 is a section in which the first wall 22 of the slide bar 20 stopping in the farthest position 20A is located. The first section W1 to the fourth section W4 may have the same interval or may have different intervals. The first section W1 to the fourth section W4 are set depending on factors, for example, the type of the luggage L assumed to be placed in the first luggage space 6 or a size of the vehicle 1.

On a right side of the first luggage space 6, a first standing wall 35 is formed. The first standing wall 35 restricts the luggage L placed in the first luggage space 6 from moving rightward. The first standing wall 35 is located so as to face the first wall 22 of the slide bar 20 in the left-and-right direction. The luggage L placed in the first luggage space 6 can be held in the left-and-right direction between the first standing wall 35 and the first wall 22 of the slide bar 20. In addition, a second standing wall 36 is formed on a front side of the first luggage space 6. The second standing wall 36 restricts the luggage L placed in the first luggage space 6 from moving forward. The luggage L placed in the first luggage space 6 can be held in the front-and-rear direction between the second standing wall 36 and the second wall 24 of the slide bar 20.

The first standing wall 35 is provided with the second small bar 30 which is movable between a stored position in which the second small bar 30 is stored in the first standing wall 35 and a first protruding position 30A in which the second small bar 30 protrudes to the outside of the first standing wall 35. The second small bar 30 moves between the stored position and the first protruding position 30A via an opening 31 formed on the first standing wall 35. The second small bar 30 is further movable to a second protruding position 30B in which the second small bar 30 protrudes leftward beyond the first protruding position 30A. The second small bar 30 moves to the stored position, the first protruding position 30A, or the second protruding position 30B on the basis of the stop position of the slide bar 20 in the left-and-right direction. The second small bar 30 located in the stored position does not restrict the luggage L from moving. The second small bar 30 that is located in the first protruding position 30A and the second small bar 30 that is located in the second protruding position 30B each restrict the luggage L from moving rearward.

(Electrical Configuration of Luggage System)

Figure 5:
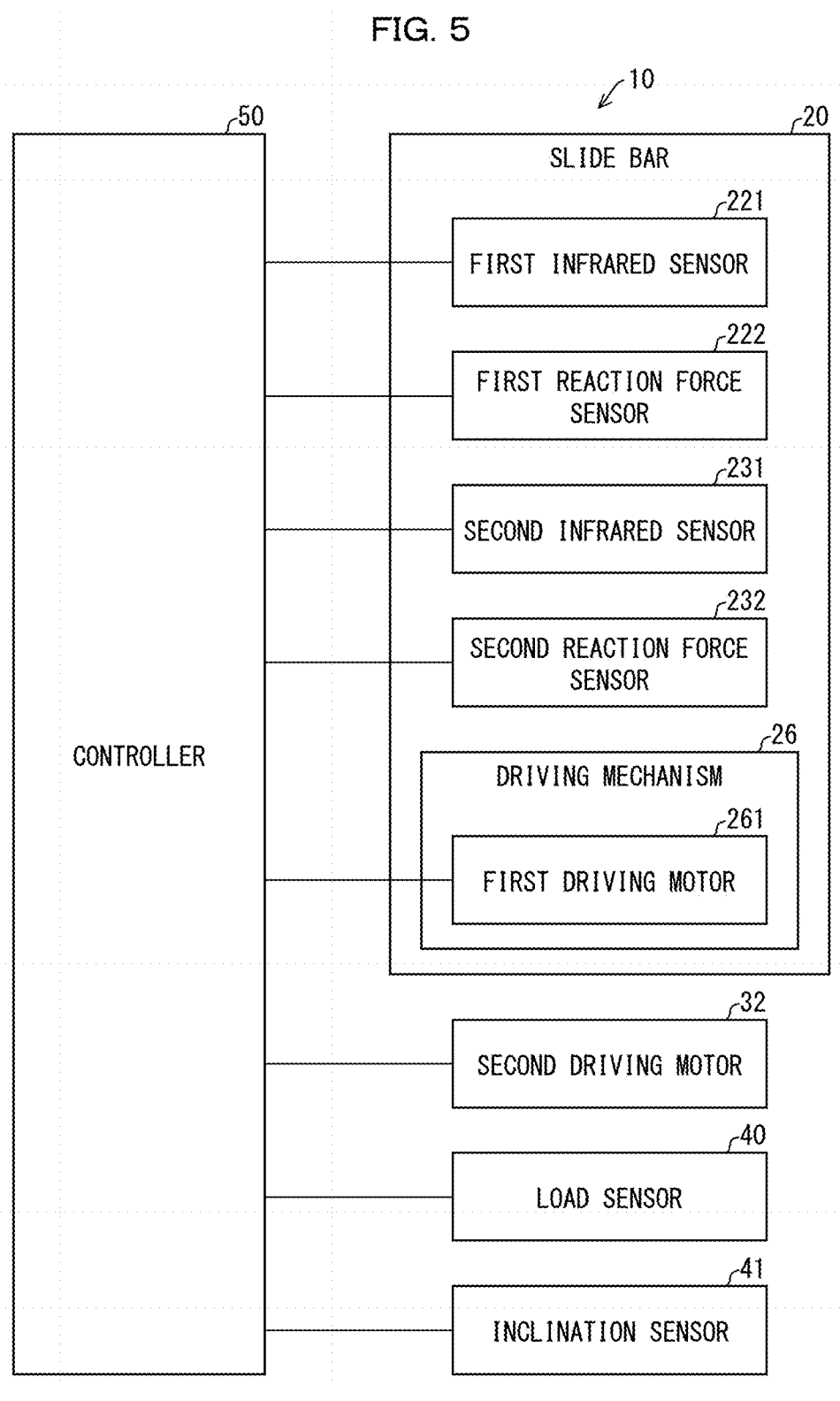
FIG. 5 is a block diagram illustrating an electrical configuration of a luggage system.

With reference to FIG. 5, the following description will discuss the electrical configuration of the luggage system 10. FIG. 5 is a block diagram illustrating the electrical configuration of the luggage system 10. The luggage system 10 further includes a load sensor 40, an inclination sensor 41, and a controller 50.

The controller 50 is constituted by a microcomputer including a processor, such as a central processing unit (CPU); a memory, such as a RAM or a ROM; and a communication interface. The processor of the controller 50 executes various types of control in accordance with a control program stored in the memory.

The controller 50 controls the driving mechanism 26 described later to control movement of the slide bar 20. In addition, the controller 50 controls the first small bar 25 to cause the first small bar 25 to move to the normal position 25A or the extension position 25B on the basis of the section in which the slide bar 20 stops. In addition, the controller 50 controls the second small bar 30 to cause the second small bar 30 to move to the stored position, the first protruding position 30A, or the second protruding position 30B on the basis of the section in which the slide bar 20 stops. The controller 50 may, for example, acquire positional information of the slide bar 20 with use of pointers installed at interfaces between the respective sections. Alternatively, the controller 50 may acquire the positional information of the slide bar 20 from a reader configured to read, for example, a scale or a barcode including the positional information.

The controller 50 is electrically connected with the components of the luggage system 10. More specifically, the controller 50 is electrically connected with a first infrared sensor 221, a first reaction force sensor 222, a second infrared sensor 231, a second reaction force sensor 232, a first driving motor 261, a second driving motor 32, the load sensor 40, and the inclination sensor 41.

The first infrared sensor 221 is a sensor which is attached to the first wall 22 and which can measure a distance between the first wall 22 and the luggage L placed on the first luggage space 6. The first infrared sensor 221 is one example of a distance sensor. The controller 50 acquires a distance data transmitted from the first infrared sensor 221. The first reaction force sensor 222 is a sensor which is attached to the first wall 22 and which is configured to detect a reaction force that is applied from the luggage L when the first wall 22 and the luggage L placed on the first luggage space 6 abut on each other. The controller 50 acquires reaction force data transmitted from the first reaction force sensor 222.

The second infrared sensor 231 is a sensor which is attached to the second wall 24 and which can measure a distance between the second wall 24 and the luggage L placed on the first luggage space 6. The second infrared sensor 231 is one example of a distance sensor. The controller 50 acquires distance data transmitted from the second infrared sensor 231. The second reaction force sensor 232 is a sensor configured to detect a reaction force that is applied from the luggage L when the second wall 24 and the luggage L placed on the first luggage space 6 abut on each other. The controller 50 acquires a reaction force data transmitted from the second reaction force sensor 232.

The driving mechanism 26 is a mechanism configured to drive the slide bar 20. The driving mechanism 26 includes the first driving motor 261. Driving of the first driving motor 261 enables the slide bar 20 to move in the left-and-right direction and the front-and-rear direction. Further, driving of the first driving motor 261 enables the first small bar 25 to move between the normal position 25A and the extension position 25B.

Specifically, the driving mechanism 26 includes a first driving mechanism configured to cause the slide bar 20 to move in the left-and-right direction. The first driving mechanism is a mechanism connected with the support part 21 of the slide bar 20. Examples of the first driving mechanism include a widely known power slide device including a lower rail and an upper rail configured to slide with respect to the lower rail. Specifically, the lower rail is fixed to the vehicle body 2. In the lower rail, a longitudinal direction thereof is the left-and-right direction. The upper rail connected with the support part 21 of the slide bar 20 engages with the lower rail and can relatively move in the longitudinal direction of the lower rail. The upper rail retains a nut fitted to a shaft fixed to the lower rail. When the driving motor is driven to rotate the nut of the upper rail, the nut of the upper rail relatively moves with respect to the shaft of the lower rail. This causes the upper rail to slide with respect to the lower rail, thereby causing the slide bar 20 to move in the left-and-right direction.

The driving mechanism 26 includes a second driving mechanism configured to cause the slide bar 20 to move in the front-and-rear direction. Specifically, the second driving mechanism is a mechanism configured to cause the first wall 22 and the second wall 24 to move in the front-and-rear direction with respect to the support part 21. Examples of the second driving mechanism include a widely known mechanism of a rack-and-pinion type. Specifically, a rack in which a longitudinal direction thereof is the front-and-rear direction is provided to one of the support part 21 and the first wall 22. A pinion configured to rotate through driving of the first driving motor 261 is provided to the other one of the support part 21 and the first wall 22. When the pinion is driven, the first wall 22 and the second wall 24 move in the front-and-rear direction with respect to the support part 21.

The driving mechanism 26 includes a third driving mechanism configured to cause the first small bar 25 to move between the normal position 25A and the extension position 25B. Examples of the third driving mechanism include a widely known mechanism of a rack-and-pinion type. Specifically, a rack disposed in the first small bar 25 meshes with a pinion configured to rotate through driving of the first driving motor 261.

The controller 50 controls the first driving motor 261 of the driving mechanism 26. The driving mechanism 26 includes at least one first driving motor 261. That is, the single first driving motor 261 may drive the first driving mechanism, the second driving mechanism, and the third driving mechanism which are described above. Alternatively, the first driving mechanism, the second driving mechanism, and the third driving mechanism which are described above may have their respective first driving motors 261. In addition, the controller 50 controls the second driving motor 32 configured to drive the second small bar 30.

The load sensor 40 is a sensor configured to detect whether or not the luggage L placed on the luggage space 5 exists. The load sensor 40 is one example of a detection part.

More specifically, the load sensor 40 detects a load applied to the placement surface 60 of the first luggage space 6 to detect whether or not the luggage L placed on the first luggage space 6 exists. The controller 50 acquires load data transmitted from the load sensor 40. Note that the number of the load sensors 40 disposed in the first luggage space 6 is not particularly limited. The inclination sensor 41 is a sensor configured to detect inclination of the vehicle 1 in the front-and-rear direction. The controller 50 acquires inclination data transmitted from the inclination sensor 41.

(Control Performed by Controller)

Figure 6:
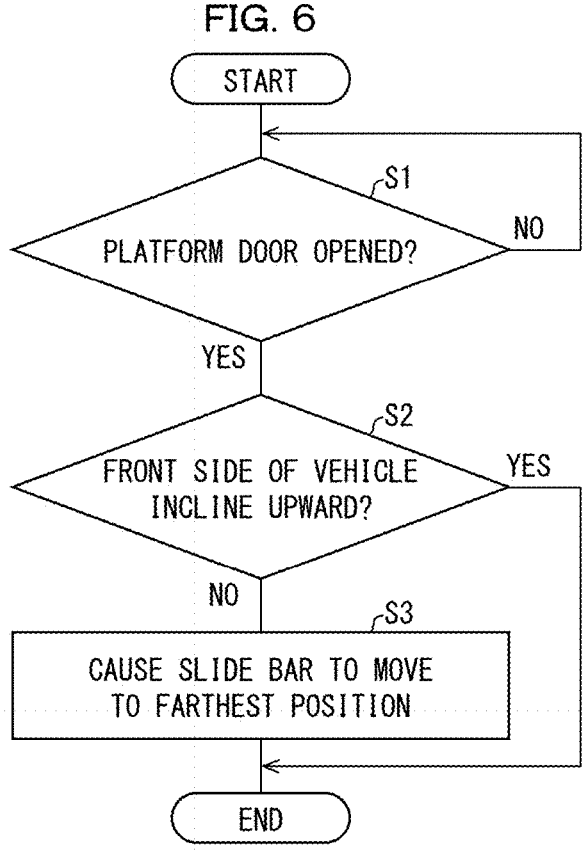
FIG. 6 is a flowchart illustrating a flow of control performed by a controller of a luggage system.

With reference to FIG. 6, the following description will discuss a flow of control that is performed by the controller 50 when the user boards and exits the vehicle 1. FIG. 6 is a flowchart illustrating a flow of control performed by the controller 50 of the luggage system 10. In the present embodiment, the controller 50 controls a position of the slide bar 20 of the luggage system 10 in response to opening or closing of the platform door 4.

First, the controller 50 determines whether or not the platform door 4 is opened (S1). In a case where the platform door 4 is not opened (S1: NO), the controller 50 repeatedly performs the step S1. In a case where the platform door 4 is opened (S1: YES), the controller 50 determines whether or not a front side of the vehicle 1 inclines upward, on the basis of the inclination of the vehicle 1 which has been detected by the inclination sensor 41 (S2).

In a case where the front side of the vehicle 1 does not incline upward (S2: NO), the controller 50 controls the first driving motor 261 to cause the slide bar 20 to move to the farthest position 20A (S3). In the step S3, the controller 50 controls the first driving motor 261 to cause the slide bar 20 to move leftward and rearward. In a case where the front side of the vehicle 1 inclines upward (S2: YES), the controller 50 ends the control illustrated in FIG. 6. That is, in a case where the front side of the vehicle 1 inclines upward, the controller 50 does not cause the slide bar 20 to move to the farthest position 20A. Therefore, in a case where the luggage L exists on the first luggage space 6, the slide bar 20 can continue to restrict the luggage L from moving. This reduces a risk that the inclination of the vehicle in the front-and-rear direction causes the luggage L to move to the outside of the first luggage space 6.

Figure 7:
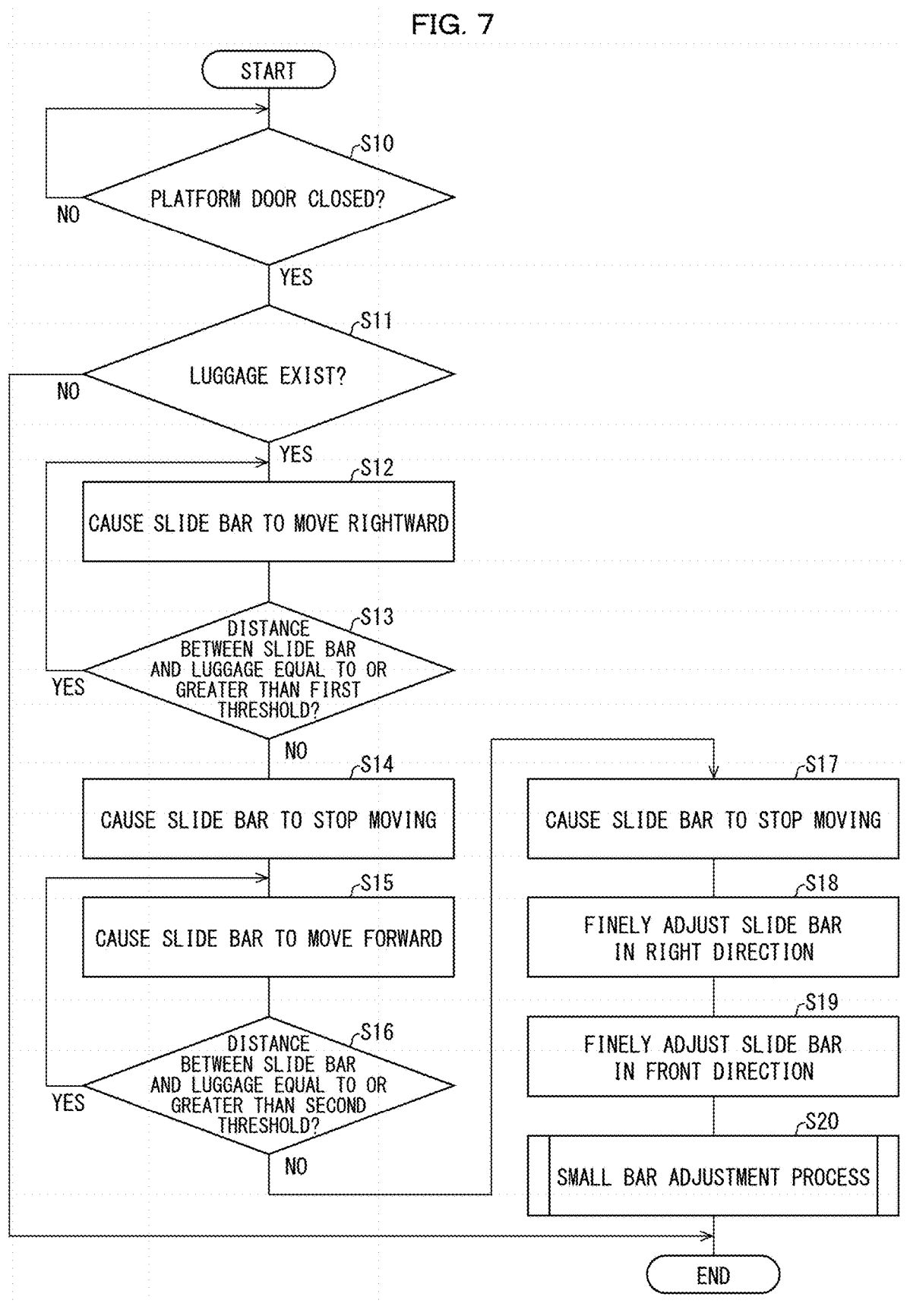
FIG. 7 is a flowchart illustrating a flow of control performed by a controller of a luggage system.
Figure 8:
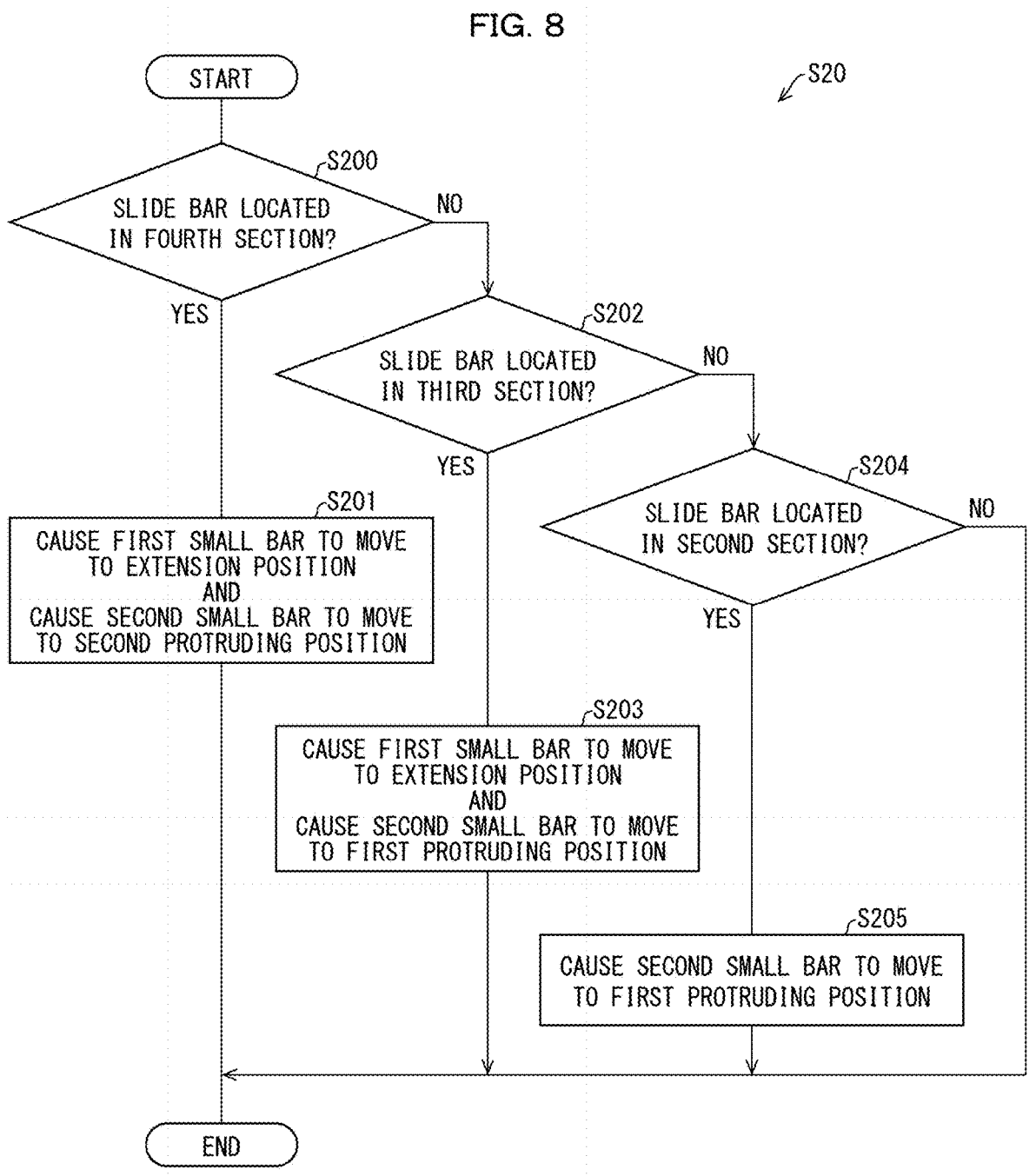
FIG. 8 is a flowchart illustrating a flow of control of a small bar adjustment process illustrated in FIG. 7.

Referring now to FIGS. 7 and 8, the following description will discuss a flow of control that is performed by the controller 50 after the user has boarded or exited the vehicle 1. FIG. 7 is a flowchart illustrating a flow of control performed by the controller 50 of the luggage system 10. FIG. 8 is a flowchart illustrating a flow of control in the small bar adjustment process S20 illustrated in FIG. 7.

First, the controller 50 determines whether or not the platform door 4 is closed (S10). In a case where the platform door 4 is not closed (S10: NO), the controller 50 repeatedly performs the step S10. In a case where the platform door 4 is closed (S10: YES), the controller 50 determines whether or not the luggage L exists on the first luggage space 6, on the basis of a detection result from the load sensor 40 (S11).

In a case where no luggage L exists (S11: NO), the controller 50 ends the control illustrated in FIG. 7. That is, the controller 50 does not cause the slide bar 20 to move. In a case where the luggage L exists (S11: YES), the controller 50 controls the first driving motor 261 to cause the slide bar 20 to move rightward (S12).

Next, the controller 50 determines whether or not a distance between the first wall 22 and the luggage L on the first luggage space 6, which has been detected by the first infrared sensor 221 is equal to or greater than a first threshold (S13). In a case where the distance detected is equal to or greater than the first threshold (S13: YES), the controller 50 performs the step S12 again. In a case where the distance detected is smaller than the first threshold (S13: NO), the controller 50 controls the first driving motor 261 to cause the slide bar 20 to stop moving rightward (S14). Next, the controller 50 controls the first driving motor 261 to cause the slide bar 20 to move forward (S15).

Next, the controller 50 determines whether or not a distance between the second wall 24 and the luggage L on the first luggage space 6, which has been detected by the second infrared sensor 231 is equal to or greater than a second threshold (S16). In a case where the distance detected is equal to or greater than the second threshold (S16: YES), the controller 50 performs the step S15 again. In a case where the distance detected is smaller than the second threshold (S16: NO), the controller 50 controls the first driving motor 261 to cause the slide bar 20 to stop moving forward (S17).

Next, the controller 50 controls the first driving motor 261 to finely adjust the stop position of the slide bar 20 in a right direction (S18). In the step S18, the controller 50 causes the first wall 22 to slowly move toward the luggage L. In the step S18, the controller 50 causes the slide bar 20 to move rightward at a speed slower than a speed at which the slide bar 20 moves in the step S12. In such a way, the stop position of the slide bar 20 in the left-and-right direction is adjusted.

In the step S18, the controller 50 may control the first driving motor 261 to adjust a force by which the first wall 22 presses the luggage L. That is, in a case where the reaction force detected by the first reaction force sensor 222 is great, the controller 50 may adjust the stop position of the slide bar 20 so as to cause the pressing force of the first wall 22 on the luggage L to be great. In contrast, in a case where the reaction force detected by the first reaction force sensor 222 is small, the controller 50 may adjust the stop position of the slide bar 20 so as to cause the pressing force of the first wall 22 on the luggage L to be small. Note that in the step S18, the slide bar 20 may be caused to stop in a position in which the first wall 22 and the luggage L do not abut on each other, in accordance with the reaction force detected by the first reaction force sensor 222.

Subsequently, the controller 50 controls the first driving motor 261 to finely adjust the stop position of the slide bar 20 in a front direction (S19). In the step S19, the controller 50 causes the second wall 24 to slowly move toward the luggage L. In the step S19, the controller 50 causes the slide bar 20 to move forward at a speed slower than a speed at which the slide bar 20 moves in the step S15. In such a way, the stop position of the slide bar 20 in the front-and-rear direction is adjusted.

In the step S19, the controller 50 may control the first driving motor 261 to adjust the pressing force of the second wall 24 on the luggage L. That is, in a case where the reaction force detected by the second reaction force sensor 232 is great, the controller 50 may adjust the stop position of the slide bar 20 so as to cause the pressing force of the second wall 24 of the slide bar 20 on the luggage L to be great. In contrast, in a case where the reaction force detected by the second reaction force sensor 232 is small, the controller 50 may adjust the stop position of the slide bar 20 so as to cause the pressing force of the second wall 24 of the slide bar 20 on the luggage L to be small. Note that in the step S19, it is possible to stop the slide bar 20 in a position in which the second wall 24 and the luggage L do not abut on each other, in accordance with the reaction force detected by the second reaction force sensor 232.

That is, in the step S18 and the step S19, the stop position of the slide bar 20 is adjusted in accordance with the type of the luggage L placed on the first luggage space 6. For example, in a case where the luggage L is a carry case, the reaction force detected by the reaction force sensor is great. In such a case of the luggage L having a solid case, pressing the luggage L rightward with use of the first wall 22 and/or pressing the luggage L forward with use of the second wall 24 causes the luggage L to be held between the first wall 22 and the first standing wall 35 and/or between the second wall 24 and the second standing wall 36. This restricts the luggage L from moving to the outside of the first luggage space 6. For example, in a case where the luggage L is a paper bag or a bag made of fabric, pressing the luggage L with use of the slide bar 20 poses a risk that an article in the luggage L breaks. Therefore, in a case where the reaction force detected by the reaction force sensor is small, the first driving motor 261 is caused to stop driving in a position which is substantially identical with a position in which the slide bar 20 abuts on the luggage L, in order to reduce the pressing force of the slide bar 20 on the luggage L.

Next, the controller 50 performs the small bar adjustment process (S20). After the small bar adjustment process S20, the controller 50 ends the control illustrated in FIG. 7. With reference to FIG. 8, the following description will discuss the small bar adjustment process S20 in detail. FIG. 8 is a flowchart illustrating a flow of control in the small bar adjustment process S20 illustrated in FIG. 7.

First, the controller 50 determines whether or not a position of the slide bar 20 in the left-and-right direction is located in the fourth section W4 (S200). In a case where the slide bar 20 is located in the fourth section W4 (S20: YES), the controller 50 controls the first driving motor 261 to cause the first small bar 25 to move to the extension position 25B and controls the second driving motor 32 to cause the second small bar 30 to move to the second protruding position 30B (S201). After the step S201, the controller 50 ends the small bar adjustment process S20. In a case where the slide bar 20 is not located in the fourth section W4 (S200: NO), the controller 50 determines whether or not the slide bar 20 is located in the third section W3 (S202).

In a case where the slide bar 20 is located in the third section W3 (S202: YES), the controller 50 controls the first driving motor 261 to cause the first small bar 25 to move to the extension position 25B and controls the second driving motor 32 to cause the second small bar 30 to move to the first protruding position 30A (S203). After the step S203, the controller 50 ends the small bar adjustment process S20. In a case where the slide bar 20 is not located in the third section W3 (S202: NO), the controller 50 determines whether or not the slide bar 20 is located in the second section W2 (S204).

In a case where the slide bar 20 is located in the second section W2 (S204: YES), the controller 50 controls the second driving motor 32 to cause the second small bar 30 to move to the first protruding position 30A (S205). After the step S205, the controller 50 ends the small bar adjustment process S20. In a case where the slide bar 20 is not located in the second section W2 (S204: NO), the controller 50 ends the small bar adjustment process S20. That is, in a case where the slide bar 20 is located in the first section W1, the first small bar 25 is located in the normal position 25A and the second small bar 30 is located in the stored position.

The luggage system 10 includes the slide bar 20 configured to move through control performed by the controller 50. Therefore, it is possible to adjust the stop position of the slide bar 20 with use of the controller 50. This makes it possible to adjust a position of the slide bar 20 in accordance with the luggage L placed in the first luggage space 6.

Further, the configuration in which the slide bar 20 includes the first wall 22 and the second wall 24 makes it possible to restrict the luggage L from moving in the left-and-right direction, with use of the first wall 22 and restrict the luggage L from moving in the front-and-rear direction, with use of the second wall 24. Furthermore, the stop position of the slide bar 20 in the front-and-rear direction is adjusted. This makes it possible to reduce a risk that the luggage L moves in the front-and-rear direction to the outside of the first luggage space 6.

In addition, the first small bar 25 being located in the extension position 25B makes it possible to reduce a possibility that the luggage L moves in the front-and-rear direction to the outside of the first luggage space 6 in a case where a total size in the left-and-right direction of the luggage L placed on the first luggage space 6 is great. Examples of such a case where a total size in the left-and-right direction of the luggage L is great include a case where a plurality of pieces of luggage L are placed and/or a case where a size in the left-and-right direction of a single piece of luggage L is great.

In addition, the configuration of including the second small bar 30 makes it possible to restrict the luggage L from moving in the front-and-rear direction with use of the second small bar 30, even in a case where the luggage L is located in a position in which it is difficult for the slide bar 20 to restrict the movement. Further, the second small bar 30 being located in the second protruding position 30B makes it possible to restrict more luggage L placed on the first luggage space 6 from moving in the front-and-rear direction. This makes it possible to further reduce a possibility that the luggage L moves to the outside of the first luggage space 6.

In a case where the luggage L is not placed on the first luggage space 6, the slide bar 20 is located in the farthest position 20A. Further, in a case where the presence of the luggage L on the first luggage space 6 has been detected, the slide bar 20 moves to the farthest position 20A in response to opening of the platform door 4. This causes the slide bar 20 to be located in a position far from the luggage L and thus enables the user to easily place the luggage L on the first luggage space 6.

Further, the controller 50 causes the slide bar 20 to stop moving in the left-and-right direction and moving in the front-and-rear direction before the slide bar 20 abuts on the luggage L, on the basis of the distances detected by the first infrared sensor 221 and the second infrared sensor 231. This reduces a possibility that abutting of the slide bar 20 on the luggage L causes the luggage L to be damaged.

The controller 50 can adjust a pressing force of the slide bar 20 in accordance with the type of the luggage L by adjusting pressing forces of the first wall 22 and the second wall 24 of the slide bar 20 on the luggage L on the basis of the reaction forces detected by the first reaction force sensor 222 and the second reaction force sensor 232.

Further, because the load sensor 40 detects whether or not the luggage L placed on the first luggage space 6 exists, a detection part is not located in a position that the user can view. This makes it possible to provide flexibility to the design of the interior space of the vehicle 1.

Embodiment 2

Figure 9:
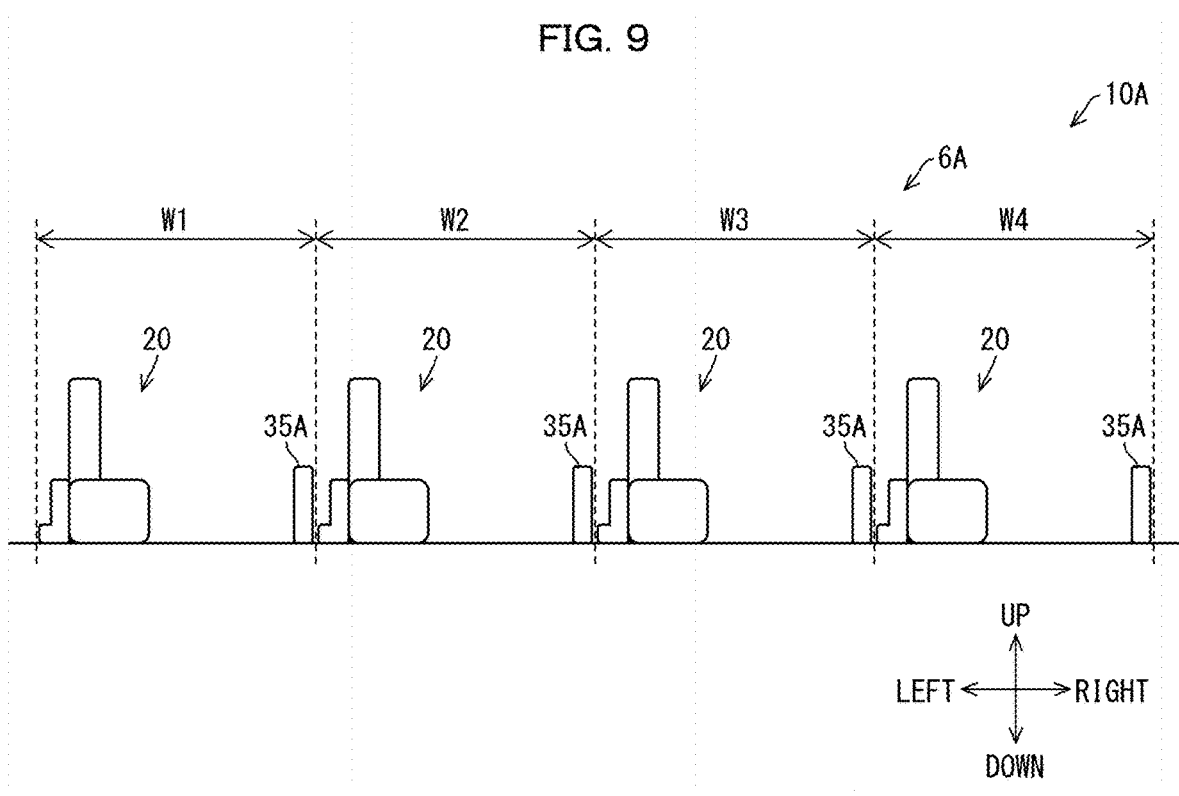
FIG. 9 is a view schematically illustrating a configuration of a luggage system in accordance with Embodiment 2 of the present disclosure.

With reference to FIG. 9, the following description will discuss another embodiment of the present disclosure. FIG. 9 is a view schematically illustrating a configuration of a luggage system 10A in accordance with Embodiment 2 of the present disclosure. For convenience of description, a member having a function identical to that of a member discussed in the embodiment above is given an identical reference sign, and a description thereof is omitted. The luggage system 10A in accordance with Embodiment 2 differs from the luggage system 10 in accordance with Embodiment 1 in that the luggage system 10A includes a plurality of slide bars 20.

As illustrated in FIG. 9, the luggage system 10A includes the plurality of slide bars 20 disposed on a first luggage space 6A. In the present embodiment, the luggage system 10A includes four slide bars 20. The four slide bars 20 are disposed respectively in four first to fourth sections W1 to W4 into which the first luggage space 6A is divided in the left-and-right direction. Each of the slide bars 20 moves within the corresponding section. For example, the slide bar 20 disposed in the first section W1 is movable within the first section W1 in the left-and-right direction.

In the first section W1 to the fourth section W4, respective third standing walls 35A are disposed. Each of the third standing walls 35A is located so as to, in the left-and-right direction, face a first wall 22 of the corresponding one of the slide bars 20. The third standing wall 35A and the first wall 22 of the slide bar 20 can hold therebetween the luggage L placed on the corresponding section.

Note that the first section W1 to the fourth section W4 on which respective pieces of luggage L are to be placed may be associated with the seats 3A to 3D on which users are to be seated. For example, it may be determined that the user to be seated on the seat 3A places his/her luggage L on the first section W1, the user to be seated on the seat 3B places his/her luggage L on the second section W2, the user to be seated on the seat 3C places his/her luggage L on the third section W3, and the user to be seated on the seat 3D places his/her luggage L on the fourth section W4.

In a case where it is determined as such, respective seating sensors may be disposed in the seats 3A to 3D. The seating sensors are each a sensor configured to detect whether or not a user is seated on the corresponding one of the seats 3A to 3D. On the basis of the detection result from each of the seating sensors, the slide bar 20 in the corresponding section may move.

For example, in a case where the seating sensor in the seat 3A detects that the user has been seated, the controller 50 may cause the slide bar 20 in the first section W1 to move rightward. In a case where the seating sensor in the seat 3A detects that the user has stood up, the controller 50 may cause the slide bar 20 in the first section W1 to move leftward.

The seating sensors may be each a sensor configured to detect a load applied to the corresponding one of the seats 3A to 3D or may be each a sensor configured to detect that a plate of a seat belt of the corresponding one of the seats 3A to 3D has been coupled to the buckle.

Embodiment 3

The following description will discuss another embodiment of the present disclosure. For convenience of description, a member having a function identical to that of a member discussed in the embodiments above is given an identical reference sign, and a description thereof is omitted. In a luggage system in accordance with Embodiment 3, instead of the load sensor 40 which is included in the luggage system 10 in accordance with Embodiment 1 and which is configured to detect whether or not the luggage L placed on the luggage space 5 exists, a camera installed in the interior space of the vehicle 1 is used.

The camera is located on an upper side of the vehicle 1 and is disposed so as to be able to capture an image of the luggage space 5. More specifically, the camera is disposed so as to be able to capture an image of the first luggage space 6. The camera detects the luggage L placed on the first luggage space 6. The camera is one example of a detection part. The controller 50 controls the movement of the slide bar 20 in accordance with a result of the detection performed by the camera as to whether or not the luggage L exists.

Further, the camera may be configured to detect a position of the luggage L and a size of the luggage L. The controller 50 may cause the slide bar 20 to move on the basis of the position of the luggage L and the size of the luggage L which have been detected by the camera. In this case, it is not necessary that the slide bar 20 is provided with the infrared sensors 221 and 231 and the reaction force sensors 222 and 232.

Other Embodiments

In the above embodiments, the descriptions are made for the case of the vehicle 1 configured to be automatically driven. However, the vehicle 1 is not limited to an automated driving vehicle. The vehicle 1 may be a vehicle that travels through an operation performed by a driver. In the case of the vehicle that travels through an operation performed by a driver, the luggage space 5 may be formed between a driver seat and the seats in the front-and-rear direction of the vehicle 1. Alternatively, the vehicle 1 may be a vehicle that conveys only the luggage L without users aboard.

In the above embodiments, the luggage space 5 is located on a front side of the vehicle 1. However, this configuration should not be construed as a limitation. The luggage space 5 may be located on a rear side of the vehicle 1. Alternatively, the luggage space 5 may be formed in a different space from the space in which the users exist, for example, in a trunk.

In the above embodiments, the slide bar 20 includes the first wall 22 and the second wall 24. However, this configuration should not be construed as a limitation. The slide bar 20 may include only the first wall 22. In addition, the first wall 22 is not limited to the configuration of moving in the left-and-right direction. The first wall 22 may move in the front-and-rear direction. In this case, the second wall 24 moves in the left-and-right direction.

In the above embodiments, the slide bar 20 is caused to move along the placement surface 60 in response to opening or closing of the platform door 4 or in response to sitting down or standing up of the user. However, these configurations should not be construed as a limitation. A configuration may be employed in which under circumstances in which a user is assumed to load or unload the luggage L, the slide bar 20 is caused to move. For example, when an engine of the vehicle 1 is driven or stops driving, when approach of the user to the first luggage space 6 is detected, or when the user operates an operation button for causing the slide bar 20 to move, the slide bar 20 may be caused to move.

In the above embodiments, the controller 50 causes the slide bar 20 to move to the farthest position 20A in response to opening of the platform door 4. However, the configuration of causing the slide bar 20 to move to the farthest position 20A should not be construed as a limitation. For example, the controller 50 may cause the slide bar 20 to move to a position that does not allow the first reaction force sensor 222 and the second reaction force sensor 232 to detect reaction forces. That is, the controller 50 causes the slide bar 20 to move leftward and rearward and causes the slide bar 20 to stop in a position that allows for releasing of the holding of the luggage L between the first wall 22 and the first standing wall 35 and releasing of the holding of the luggage L between the second wall 24 and the second standing wall 36. In this case, the controller 50 adjusts the stop position of the slide bar 20 in a left direction or a rear direction such that an interval between the first wall 22 and the luggage L in the left-and-right direction and an interval between the second wall 24 and the luggage L in the front-and-rear direction are respective predetermined intervals.

In the above embodiments, the controller 50 detects the inclination of the vehicle 1 in the front-and-rear direction on the basis of the inclination sensor 41. However, this configuration should not be construed as a limitation. For example, the controller 50 may, while the vehicle 1 is travelling, detect the inclination of the vehicle 1 in the front-and-rear direction on the basis of change in a value of a load detected by the second reaction force sensor 232.

In the above embodiments, the load sensor 40 or the camera detects whether or not the luggage L placed on the first luggage space 6 exists. However, such a configuration should not be construed as a limitation. An infrared sensor may detect whether or not the luggage L in the first luggage space 6 exists.

ADDITIONAL REMARKS

The present disclosure is not limited to the embodiments above, but can be altered by a skilled person in the art within the scope of the claims. The present disclosure also encompasses, in its technical scope, any embodiment derived by combining technical means disclosed in differing embodiments as appropriate.

REFERENCE SIGNS LIST

1 Vehicle
5 Luggage space
6 First luggage space
7 Second luggage space
10 Luggage system
20 Slide bar
25 First small bar
26 Driving mechanism
30 Second small bar
40 Load sensor
50 Controller
60 Placement surface

The invention claimed is:

1. A luggage system included in a vehicle, the luggage system comprising:
   a detection part configured to detect whether or not luggage placed on a placement surface of a luggage space exists;
   a slide bar configured to move in a first direction along the placement surface;
   a driving mechanism configured to drive the slide bar; and
   a controller, wherein
   in a case where the detection part has detected that the luggage exists, the controller controls the driving mechanism to cause the slide bar to move in the first direction and adjusts a stop position of the slide bar in the first direction.

2. The luggage system according to claim 1, wherein the slide bar includes a first wall extending in a second direction which is along the placement surface and which intersects with the first direction and a second wall connected with the first wall and extending in the first direction.

3. The luggage system according to claim 2, wherein:
the second wall includes a first small bar; and
the first small bar is movable between a normal position and an extension position in which the first small bar extends in the first direction beyond the normal position.

4. The luggage system according to claim 1, further comprising a second small bar movable between a stored position in which the second small bar is stored in a standing wall located so as to face the slide bar in the first direction and a first protruding position in which the second small bar protrudes to an outside of the standing wall.

5. The luggage system according to claim 4, wherein the second small bar is movable to a second protruding position in which the second small bar protrudes in a third direction opposite to the first direction beyond the first protruding position.

6. The luggage system according to claim 1, wherein in a case where no luggage exists in the luggage space, the slide bar is located in a farthest position located furthest in a third direction opposite to the first direction within a range in which the slide bar is movable.

7. The luggage system according to claim 1, wherein in a case where the detection part has detected that the luggage exists, the controller causes the slide bar to move in a third direction opposite to the first direction when a predetermined condition is satisfied.

8. The luggage system according to claim 7, wherein in a case where the controller detects that the vehicle inclines in a second direction intersecting with the first direction, the controller does not cause the slide bar to move in the third direction.

9. The luggage system according to claim 2, wherein the controller controls the driving mechanism to cause the slide bar to move in a second direction which is along the placement surface and which intersects with the first direction, and the controller adjusts a stop position of the slide bar in the second direction.

10. The luggage system according to claim 1, wherein:
the slide bar includes a distance sensor that is able to measure a distance in the first direction between the slide bar and the luggage placed on the placement surface; and
in a case where a result of measurement of the distance sensor is smaller than a first threshold, the controller causes the slide bar to temporarily stop moving in the first direction.

11. The luggage system according to claim 1, wherein:
the slide bar includes a reaction force sensor configured to detect a reaction force applied from the luggage; and
on the basis of a reaction force that has been detected by the reaction force sensor, the controller controls the driving mechanism to adjust a force by which the slide bar presses the luggage.

12. The luggage system according to claim 1, wherein the detection part is a load sensor configured to detect a load of the luggage placed on the placement surface.

13. The luggage system according to claim 1, wherein the detection part is a camera that is able to capture an image of the luggage space.

14. A vehicle comprising the luggage system according to claim 1, wherein the luggage space is located on a front side of an interior space of the vehicle.

15. A vehicle comprising the luggage system according to claim 1, wherein the luggage space is located alongside a movement line that a user follows and that is defined by a pathway which is formed in an interior space of the vehicle and along which the user is to pass.

\* \* \* \* \*